United States Patent
Lim

(10) Patent No.: US 10,344,942 B2
(45) Date of Patent: Jul. 9, 2019

(54) BACKLIGHT APPARATUS FOR VEHICLE AND MANUFACTURING METHOD THEREOF

(71) Applicant: Seok Bum Lim, Siheung-si (KR)

(72) Inventor: Seok Bum Lim, Siheung-si (KR)

( * ) Notice: Subject to any disclaimer, the term of this patent is extended or adjusted under 35 U.S.C. 154(b) by 0 days.

(21) Appl. No.: 15/920,648

(22) Filed: Mar. 14, 2018

(65) Prior Publication Data
US 2018/0266648 A1     Sep. 20, 2018

(30) Foreign Application Priority Data

Mar. 16, 2017     (KR) .......................... 10-2017-0033185

(51) Int. Cl.
| | |
|---|---|
| *B60Q 9/00* | (2006.01) |
| *B60R 1/12* | (2006.01) |
| *G08G 1/16* | (2006.01) |
| *F21S 43/14* | (2018.01) |
| *F21S 43/20* | (2018.01) |

(Continued)

(52) U.S. Cl.
CPC .............. *F21S 45/50* (2018.01); *B60Q 9/008* (2013.01); *B60R 1/1207* (2013.01); *F21S 43/14* (2018.01); *F21S 43/239* (2018.01); *F21S 43/26* (2018.01); *F21S 43/27* (2018.01); *F21S 43/31* (2018.01); *G08G 1/167* (2013.01); *F21Y 2115/10* (2016.08)

(58) Field of Classification Search
CPC .. F21S 45/50; F21S 43/26; F21S 43/24; F21S 43/27; F21S 43/239; F21S 43/31; B60Q 9/008; G08G 1/167; B60R 1/1207; F21Y 2115/10

See application file for complete search history.

(56) References Cited

U.S. PATENT DOCUMENTS

| | | | |
|---|---|---|---|
| 9,862,308 | B2 | 1/2018 | Oh |
| 2004/0241358 | A1 | 12/2004 | Kotani et al. |
| 2015/0251603 | A1* | 9/2015 | Kim ........................ B60R 1/081 |
| | | | 362/511 |

FOREIGN PATENT DOCUMENTS

| | | |
|---|---|---|
| JP | 2005-007872 A | 1/2005 |
| KR | 10-1252880 B1 | 4/2013 |

(Continued)

*Primary Examiner* — Joseph L Williams
*Assistant Examiner* — Jose M Diaz
(74) *Attorney, Agent, or Firm* — Rabin & Berdo, P.C.

(57) ABSTRACT

A backlight apparatus for vehicle and a manufacturing method thereof are provided, in which the backlight apparatus for vehicle includes a case having an opening formed at a lower portion, a lens provided on a front side of the case, a circuit part seated on an inner lower portion of the case through the opening, and mounted with a light source for emitting light; a light guide plate mounted on an inner upper portion of the case through the opening to diffuse the light emitted from the light source and deliver the light to the lens, a reflective plate disposed behind the light guide plate through the opening to reflect light leaking to the back of the light guide plate, and a sealing part for sealing the opening with the circuit part seated therein. A molded blind spot detection (BSD) that integrates therein lens and case is formed by a single molding process instead of repeated process of fusing and epoxying that are necessary in the related art, by use of resin molding, which not only forms an appearance of a product, but also provides a complete waterproof and sealing function.

10 Claims, 6 Drawing Sheets

(51) Int. Cl.
*F21S 43/27* (2018.01)
*F21S 43/31* (2018.01)
*F21S 45/50* (2018.01)
*F21S 43/239* (2018.01)
*F21Y 115/10* (2016.01)

(56) References Cited

FOREIGN PATENT DOCUMENTS

KR 10-1526792 B1 6/2015
KR 2016-0000790 U 3/2016

* cited by examiner

BACKLIGHT APPARATUS FOR VEHICLE AND MANUFACTURING METHOD THEREOF

CROSS-REFERENCE TO RELATED APPLICATIONS

This application claims priority from Korean Patent Application No. 10-2017-0033185, filed on Mar. 16, 2017 in the Korean Intellectual Property Office, the disclosure of which is incorporated herein by reference in its entirety.

BACKGROUND

Technical Field

The present disclosure relates to a backlight apparatus for vehicle and a manufacturing method thereof, and more particularly, to a backlight apparatus for vehicle, which is used for a rear side warning system of the vehicle, and a manufacturing thereof.

Background Art

Generally, while a vehicle is driving, a blind spot detection (BSD) system of the vehicle detects an obstacle approaching toward a rear side of the vehicle and provides corresponding information to the driver to thus prevent an accident in advance. The BSD system is equipped with a BSD module installed in a side-view mirror or a rearview mirror of the vehicle, and the BSD module can inform the driver of the danger by emitting light to an icon indicated on the side-view mirror.

Conventionally, to ensure that the conventional BSD module is waterproofed and sealed, the upper and lower cases are fused together and the gap generated due to electric wire is bonded with epoxy.

However, there is a problem that the productivity is reduced due to such need for repeated processing of fusing and epoxying.

In addition, there is a problem that a time delay occurs until delivery of the product, since the drying after the epoxy process takes about 10 minutes or longer, thus increasing a waiting time until the product is completed.

Further, there is a problem that unnecessary factors such as the drying time or the drying space for the epoxy, etc. are increased, particularly when the BSD module is mass-produced.

SUMMARY

Accordingly, it is a technical object of the present disclosure to provide a backlight apparatus for vehicle and a manufacturing method thereof, in which a molded blind spot detection (BSD) that integrates therein lens and case is formed by a single molding process instead of repeated process of fusing and epoxying that are necessary in the related art, by use of resin molding, which not only forms an appearance of a product, but also provides a complete waterproof and sealing function.

Further, in addition to the objects explicitly mentioned herein, the present disclosure includes other objects that may be achieved from the configuration of the present disclosure described below.

According to an exemplary embodiment of the present disclosure to solve the technical problem described above, a backlight apparatus for vehicle and a manufacturing method thereof are provided, in which the backlight apparatus for vehicle may include a case having an opening formed at a lower portion, a lens provided on a front side of the case, a circuit part seated on an inner lower portion of the case through the opening, and mounted with a light source for emitting light; a light guide plate mounted on an inner upper portion of the case through the opening to diffuse the light emitted from the light source and deliver the light to the lens, a reflective plate disposed behind the light guide plate through the opening to reflect light leaking to the back of the light guide plate, and a sealing part for sealing the opening with the circuit part seated therein.

Meanwhile, a manufacturing method a backlight apparatus for vehicle according to an exemplary embodiment of the present disclosure may include, placing, through an opening at a lower portion of a case, a reflective plate for reflecting light, wherein the case has a lens provided on a front side, placing, through the opening, a light guide plate for diffusing the light and delivering the same to the lens, on the reflective plate inside the case, seating a circuit part having a light source for emitting light mounted thereon, at an inner lower portion of the case, and sealing the opening with the circuit part seated therein.

The case may be integrally formed with the lens.

The case may be formed with at least one hole passed through the case in a downward direction from a position at which the circuit part is seated, and the sealing the opening with the circuit part seated therein may include supplying a molding resin to the opening with the circuit part seated therein, and to the at least one hole, to seal the opening and the at least one hole.

The reflective plate may include a flat plate part and a bent part bent from both ends of the flat plate part to reflect light leaking to the back and sides of the light guide plate.

The flat plate part may be integrally formed with the bent part.

The sealing the opening with the circuit part seated therein may include mounting the backlight apparatus for vehicle in a space between an upper mold and a lower mold, and in a state that the vehicle backlight is mounted, suppling the molding resin through an injection hole formed in the upper mold to seal the opening.

The molding resin may be formed of any of polyvinyl chloride (PVC), polypropylene (PP), Macromelt, and hot-melt.

The present disclosure gives the following effects.

As described above, according to the backlight apparatus for vehicle and the manufacturing method thereof according to the embodiment of the present disclosure, there is an advantage that a molded blind spot detection (BSD) that integrates therein lens and case is formed by a single molding process instead of repeated process of fusing and epoxying that are necessary in the related art, by use of resin molding, which not only forms an appearance of the backlight apparatus for vehicle, but also provides a complete waterproof and sealing function.

In addition, there is an advantage that the number of parts and manufacturing processes can be reduced so that manufacturing time and manufacturing cost can be reduced.

In addition, since the cost of a molding die is considerably cheaper than a general plastic injection mold by about 1/10, there is an advantage that development costs can be greatly reduced.

Meanwhile, the effects of the present disclosure are not limited to those described above, and other effects that may be derived from the constitution of the present disclosure described below are also included in the effects of the present disclosure.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Hereinafter, preferred embodiments of the present disclosure will be described in detail with reference to the accompanying drawings so that those with ordinary knowledge in the art can easily achieve the present disclosure.

Figure 1:
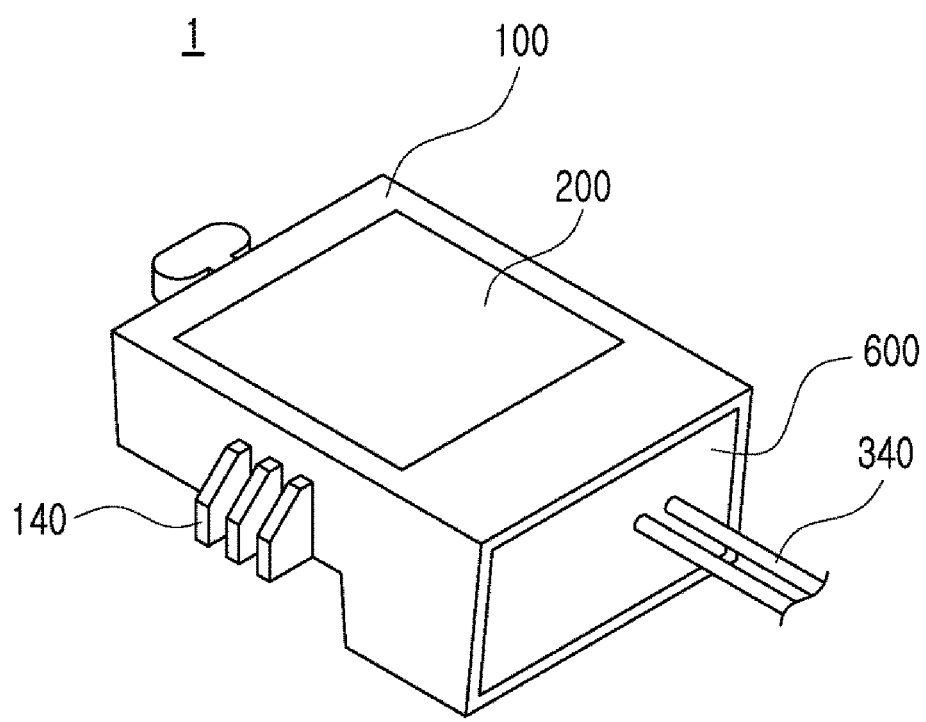
FIG. 1 is a perspective view of a backlight apparatus for vehicle according to an exemplary embodiment.
Figure 2:
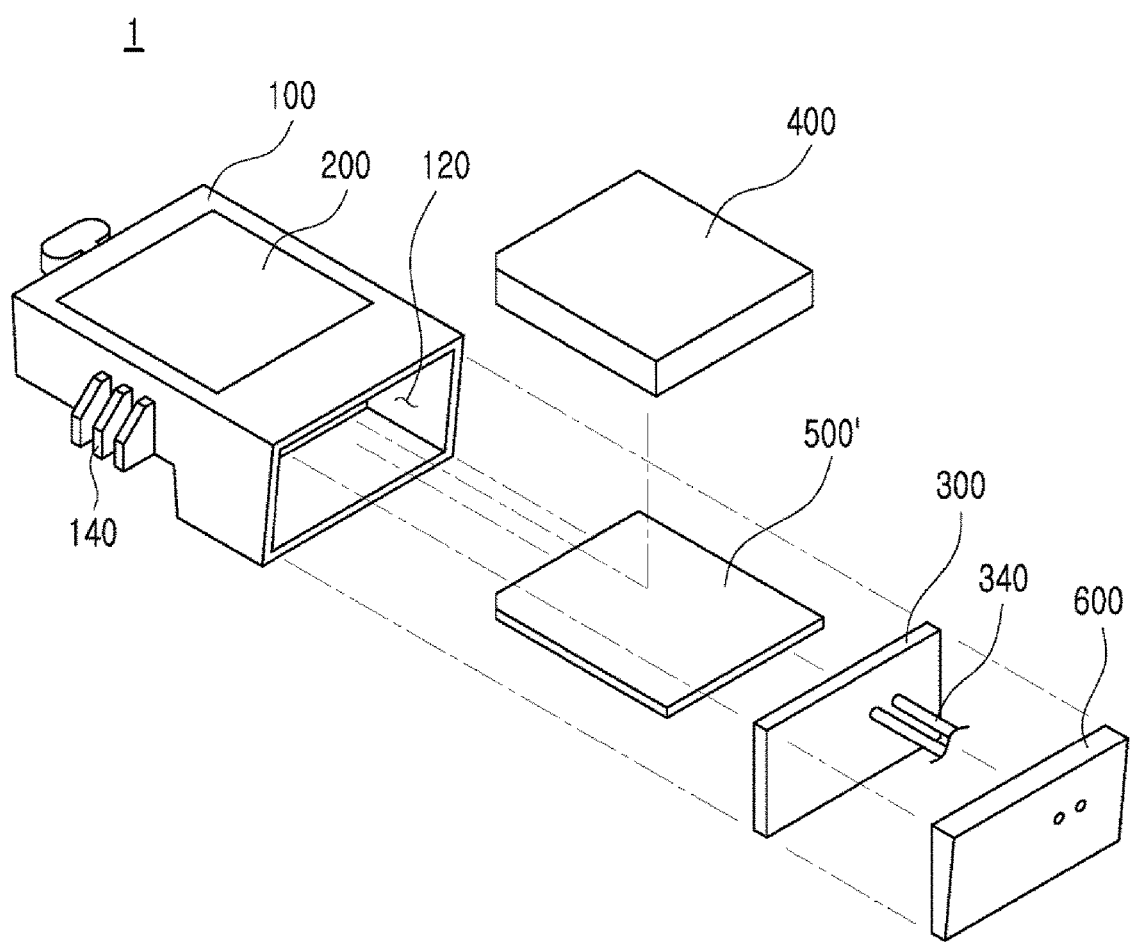
FIG. 2 is an exploded perspective view of a backlight apparatus for vehicle according to an exemplary embodiment.

FIG. 1 is a perspective view of a backlight apparatus for vehicle according to an exemplary embodiment, and FIG. 2 is an exploded perspective view of a backlight apparatus for vehicle according to an exemplary embodiment.

As shown in FIGS. 1 and 2, a backlight apparatus 1 for vehicle is provided, which includes a case 100, a lens 200, a circuit part 300, a light guide plate 400, a reflective plate 500', and a sealing part 600.

The backlight apparatus 1 for vehicle is externally supplied with power, and upon sensing a danger, provides light to an icon indicated on a side-view mirror or rearview mirror by emitting light from a light source 320 using the supplied power.

The case 100 may be formed as a block in a rectangular shape and an opening 120 may be formed at a lower portion thereof.

The case 100 includes an internal space for accommodating components such as the circuit part 300, the light guide plate 400, the reflective plate 500, and so on, thus protecting the components from the outside. In addition, on both sides of the case 100, a plurality of pins 140 parallel to each other may be respectively protruded to be fastened to the side-view mirror or the rearview mirror.

The lens 200 is provided on the front side of the case 100 and may be integrally formed with the case 100 through double injection molding. That is, when fabricating the case 100, it is possible to fabricate the case 100 in such a manner that the lens 200 is integrally bonded to the front side of the case 100 through the double injection molding. As described above, the lens assembly process for assembling the lens 200 to the case 100 may be omitted by fabricating the case 100 integrally with the lens 200.

The lens 200 may be configured to transmit the light emitted from the inside of the case 100, or to further diffuse the light that is emitted from the case 100 to the outside.

Figure 8:
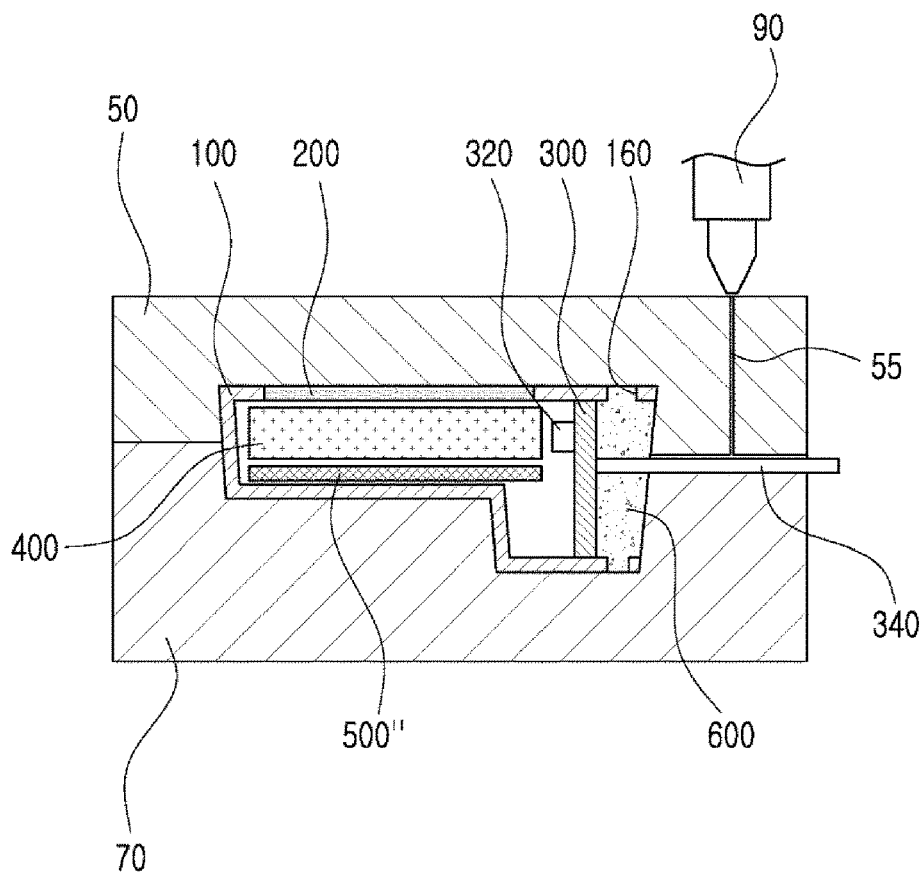

As shown in FIG. 8 that will be described below, the light source 320 may be mounted on the circuit part 300 and may be seated on an inner lower portion of the case 100 through the opening 120 to emit the light.

The light source 320 such as an LED light that is illuminable upon supply of an external power may be mounted on one side of the circuit part 300, and a cable 340 capable of receiving power from the outside may be provided on the other side of the circuit part 300. The cable 340 may receive power from the outside and provide the supplied power to the light source 320 such that the light source 320 emits light.

The light guide plate 400 may be mounted on an inner upper portion of the case 100 through the opening 120 to diffuse the light emitted from the light source 320 and deliver this to the lens 200.

The light guide plate 400 is configured to convert a line or point light source into a plane light source, by receiving the light emitted from the light source 320 and uniformly diffusing the received light throughout the entire region of the light guide plate 400. The light guide plate 400 may receive the light emitted from the light source 320 and uniformly diffuse the received light and deliver this to the lens 200.

The reflective plate 500' may be placed behind the light guide plate 400 through the opening 120 to reflect the light leaking to the back of the light guide plate 400. The reflective plate 500' reflects the light of the light source 320 leaking to the back of the light guide plate 400 against a front side of the light guide plate 400 and the backlight apparatus 1 for vehicle, thereby preventing loss of light.

The sealing part 600 may seal the opening 120 with the circuit part 300 being seated therein. The sealing part 600 may seal the opening 120 using a molding resin, and the molding resin may include any of polyvinyl chloride (PVC), polypropylene (PP), Macromelt and hotmelt. PVC is a plastic containing vinyl chloride as a main ingredient and can be processed into a wide range of products such as films, sheets, molded articles or caps, etc. The polypropylene, or PP, can have excellent mechanical properties and thermal properties. Macromelt is a thermoplastic hotmelt that is processed with dimer acid as a raw material, and it provides excellent adhesion properties to the base layer of various materials, and also provides excellent ductility, moisture resistance and oil resistance.

More specifically, as shown in FIG. 8 that will be described below, in a state that the backlight apparatus for vehicle 1 is mounted in the space between the upper mold 50 and the lower mold 70, the sealing part 600 may be formed by a molding resin supplied through an injection hole 55 formed in the upper mold 50. The upper mold 50 and the lower mold 70 may be configured to be vertically separable from each other, and a molding space may be formed between the upper mold 50 and the lower mold 70. The molded BSD, that is, the backlight apparatus for vehicle 1 may be seated in the molding space, and the upper mold 50 may be provided with the injection hole 55 that is passed through the upper mold 50 so that the molding resin can be supplied into the molding space. The molding resin supplied from a molding machine 90 flows into the opening 120 having the circuit part 300 seated therein, through the injection hole 55, to fill the opening 120 so that the opening 120 is hermetically sealed.

The molding performed using this molding resin provides advantage that cost is cheaper than plastic molding and injection, since the injection time is less than about 30 seconds, which means that the working time is shorter and the working temperature is lower. In addition, depending on the price or use of the material of the molding resin, PVC or PP material can provide waterproof degrees of about IP34, and Macromelt or hotmelt material can provide waterproof degrees of IP68 or higher. When resin molding method is applied to plastic injection, there is an advantage that it is possible to develop a wide range of products that will suit the needs of the customers.

Figure 3:
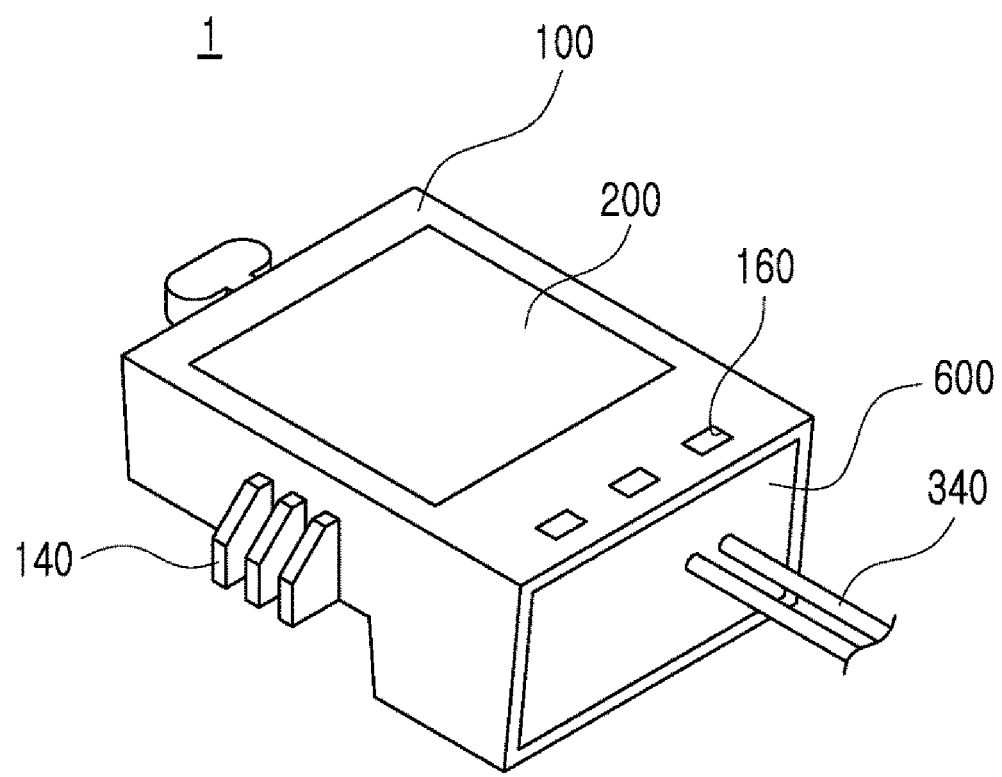
FIG. 3 is a perspective view of a backlight apparatus for vehicle according to another exemplary embodiment.
Figure 4:
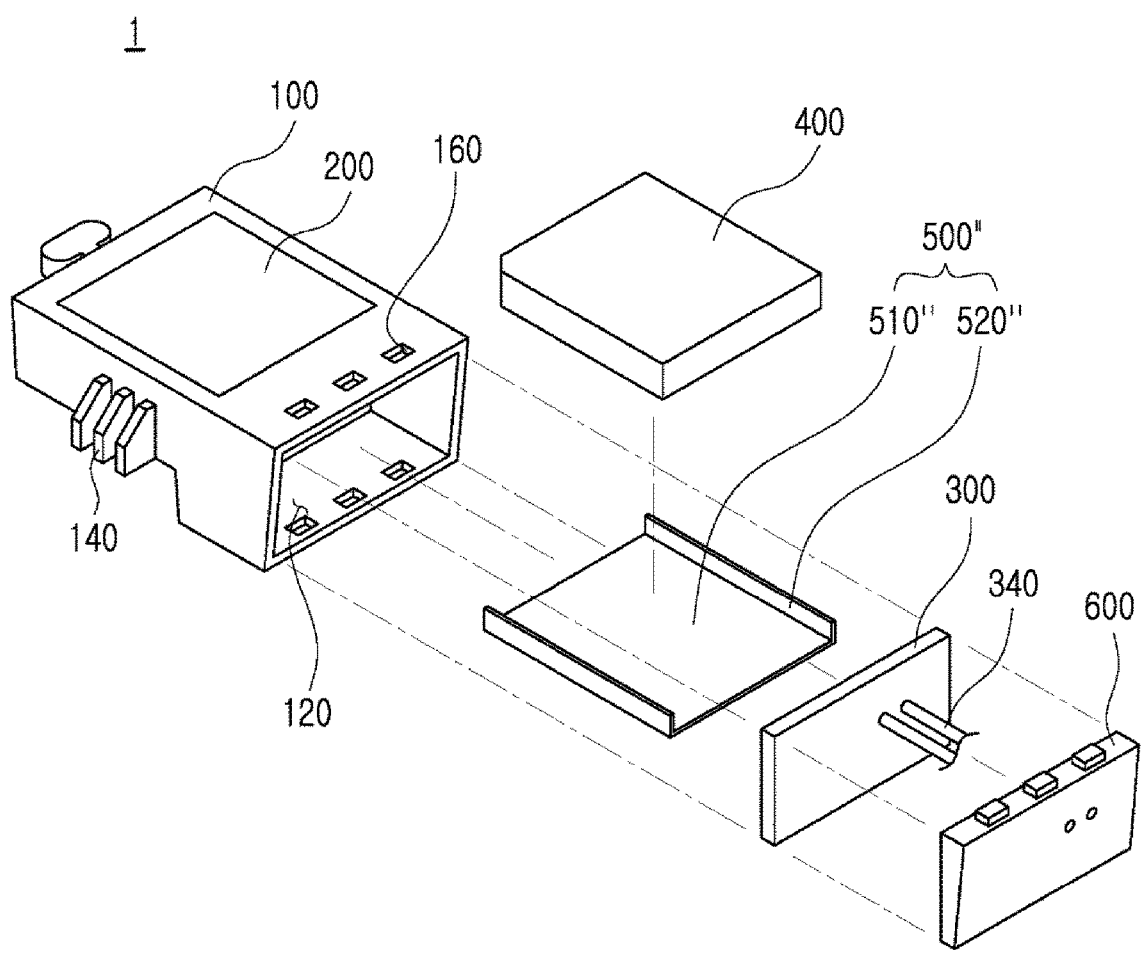
FIG. 4 is an exploded perspective view of a backlight apparatus for vehicle according to another exemplary embodiment.

FIG. 3 is an exploded perspective view of a backlight apparatus for vehicle according to another exemplary embodiment, and FIG. 4 is an exploded perspective view of a backlight apparatus for vehicle according to yet another exemplary embodiment.

Referring to FIGS. 3 and 4, a backlight apparatus 1 for vehicle includes a case 100, a lens 200, a circuit part 300, a light guide plate 400, a reflective plate 500", and a sealing part 600.

The same elements as those illustrated in FIGS. 1 and 2 will be denoted with the same reference numerals cited in FIGS. 1 and 2, and those that have already been described above will not be described in detail for the sake of brevity.

The case 100 may include at least one hole 160 passed through the case 100 in a downward direction from a position where the circuit part 300 is seated.

More specifically, if at least one hole 160 is formed in a downward from the position where the circuit part 300 is seated in the case 100, since the molding resin is also filled inside the hole 160 when the opening 120 is sealed, this can increase the adhesion between the case 100 and the sealing part 600.

Conventionally, it is not possible to produce a BSD module having the same, fixed amount of weight by the bonding that uses epoxy. The reason for this is that when epoxy fills the opening, there may occur a phenomenon that the epoxy is abundant or insufficient depending on areas, making it difficult to fill up the opening to a flat surface. For this reason, cautions have to be made so that the case is not overflowed with the epoxy. In addition, when the epoxy is not properly bonded to the case due to environmental factors or work incompleteness, there is a problem that the circuit part may be easily separated from the case.

However, when the opening is sealed using the molding resin, since the appearance of all the products can be uniformly manufactured, and also the molding resin can be kept at the same, fixed quantity, the BSD module having the same weight can be manufactured.

In addition, since the molding resin is received in the hole 160 formed in the case 100 and coupled to the case 100, the circuit part 300 can be made of a rigid structure that is not separable even when the cable 340 of the circuit part 300 is pulled out.

In addition, when bonding is performed using a conventional epoxy, there may occur a problem that the epoxy may protrude from, or overflow the hole, but when the molding resin is used, it is possible to have the constant, fixed amount of molding, thus preventing the molding resin from overflowing the hole 160 to the outside.

The reflective plate 500" may include a flat plate part 510" that reflects light leaking to the back of the light guide plate 400a, and a bent part 520" that is bent from both ends of the flat plate part 510" to reflect the light leaking to the sides of the light guide plate 400.

Conventionally, a method of attaching a light shielding tape to the sides of the light guide plate 400 is used to reduce the loss of light that occurs due to an air gap between the light guide plate 400 and the case 100. However, in another exemplary embodiment of the present disclosure, using the bent part 520" bent from both ends of the flat plate part 510" instead of the light shielding tape, the light leaked not only to the back of the light guide plate 400 but also to the sides of the light guide plate 400 can be reflected on the reflective plate 500", thus resulting in increased luminance (brightness).

In addition, the flat plate part 510" may be integrally formed with the bent part 520". For example, the bent part 520" may be bent at a predetermined angle from both ends of the flat plate part 510" through a folding process by a folding line, a bending process, or a pressing process.

As described above, since the time for attaching the conventional light shielding tape (about 20 seconds) can be reduced to about 5 seconds by instead folding the reflective plate, cost is reduced, and time is shortened, while the luminance can also be increased.

The operation process of the backlight apparatus for vehicle 1 manufactured as described above will be briefly described.

When power is supplied to the light source 320 through the cable 340 in response to a signal of the system that is generated upon perceiving an obstacle approaching towards the rear side of the vehicle, the light emitted from the light source 320 is uniformly diffused to the front direction and delivered through the light guide plate 400, and the light leaking to the back of the light guide plate 400 may be reflected against the reflective plates 500', 500" to the front direction. Then, the light that passes through the light guide plate 400 may be emitted to the outside through the lens 200, and the light emitted to the outside may be delivered to an icon indicated on the side-view mirror or the rearview mirror, thus informing the driver that the obstacle is close to the blind side at the rear side.

Hereinafter, a manufacturing process of a backlight apparatus for vehicle according to an exemplary embodiment of the present disclosure will be described.

FIGS. 5 to 8 are views showing a process of manufacturing a backlight apparatus for vehicle according to an exemplary embodiment.

Figure 5:
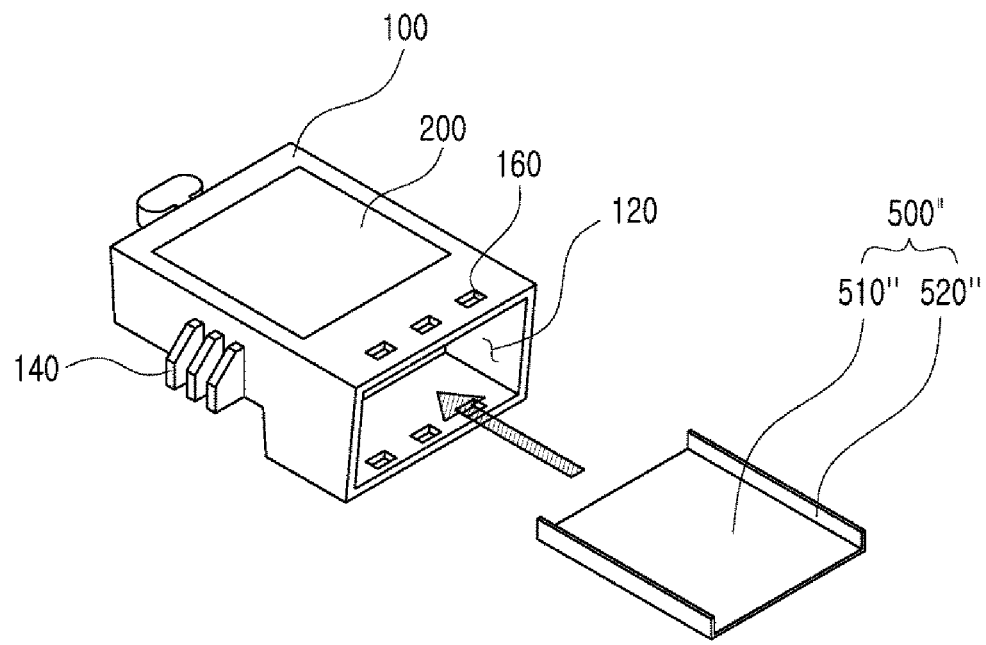
FIGS. 5 to 8 are views showing a process of manufacturing a backlight apparatus for vehicle according to an exemplary embodiment.

Referring to FIG. 5, the reflective plate 500" may be placed into the case 100 through the opening 120 provided in the lower portion of the case 100 that has the lens 200 formed on the front side. The case 100 may be formed as a block in a rectangular shape and an opening 120 may be formed at a lower portion thereof. The case 100 includes an internal space for accommodating components such as the circuit part 300, the light guide plate 400, the reflective plate 500, and so on, thus protecting the components from the outside. In addition, on both sides of the case 100, a plurality of pins 140 parallel to each other may be respectively protruded to be fastened to the side-view mirror or the rearview mirror. Further, the case 100 may include at least one hole 160 passed through the case 100 in a downward direction from a position where the circuit part 300 is seated.

The lens 200 may be integrally formed with the case 100 through double injection molding. That is, when fabricating the case 100, it is possible to fabricate the case 100 in such a manner that the lens 200 is integrally bonded to the front side of the case 100 through the double injection molding. As described above, need for the lens assembly process may be eliminated by fabricating the case 100 integrally with the lens 200. The lens 200 may be configured to transmit the light emitted from the inside of the case 100, or to further diffuse the light that is emitted from the case 100 to the outside.

The reflective plate 500" may include a flat plate part 510" that reflects light leaking to the back of the light guide plate 400a, and a bent part 520" that is bent from both ends of the flat plate part 510" to reflect the light leaking to the sides of the light guide plate 400.

Conventionally, a method of attaching a light shielding tape to the sides of the light guide plate 400 is used to reduce the loss of light that occurs due to an air gap between the light guide plate 400 and the case 100. However, in another exemplary embodiment of the present disclosure, using the bent part 520" bent from both ends of the flat plate part 510" instead of the light shielding tape, the light leaked not only to the back of the light guide plate 400 but also to the sides of the light guide plate 400 can be reflected on the reflective plate 500", thus resulting in increased luminance (brightness).

In addition, the flat plate part 510" may be integrally formed with the bent part 520". For example, the bent part 520" may be bent at a predetermined angle from both ends of the flat plate part 510" through a folding process by a folding line, a bending process, or a pressing process.

Meanwhile, it is of course possible that the reflective plate may be formed in a flat plate shape as shown in FIG. 2.

Figure 6:
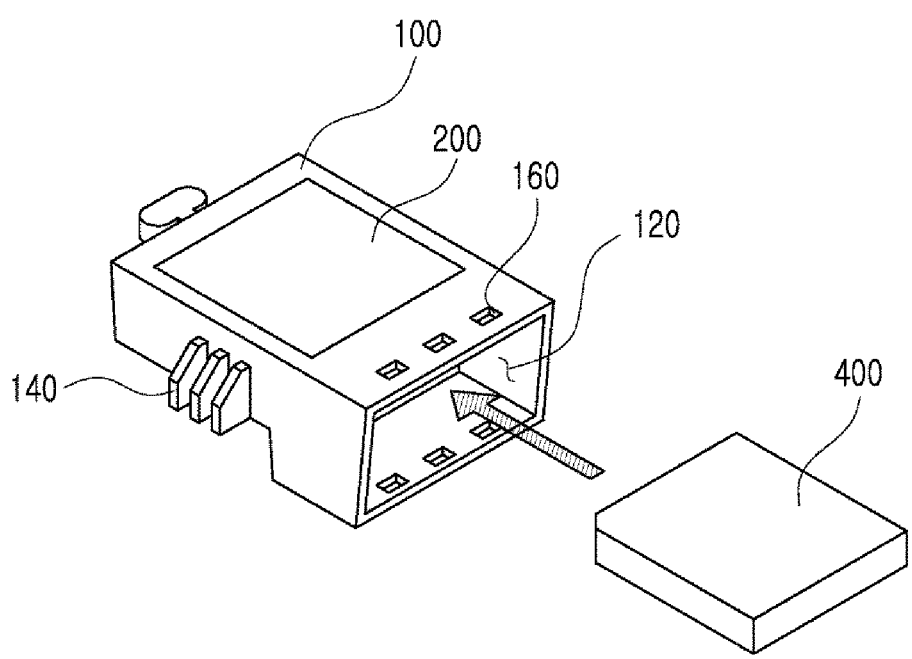

In addition, as shown in FIG. 6, the light guide plate 400 for diffusing the light through the opening 120 and delivering the light to the lens 200 may be disposed on the inner reflective plate 500" of the case 100. The light guide plate 400 is configured to convert a line or point light source into a plane light source, by receiving the light emitted from the light source 320 to be described below with reference to FIG. 8 and uniformly diffusing the received light throughout the entire region of the light guide plate 400. The light guide plate 400 may receive the light emitted from the light source 320 and uniformly diffuse the received light and deliver this to the lens 200.

Figure 7:
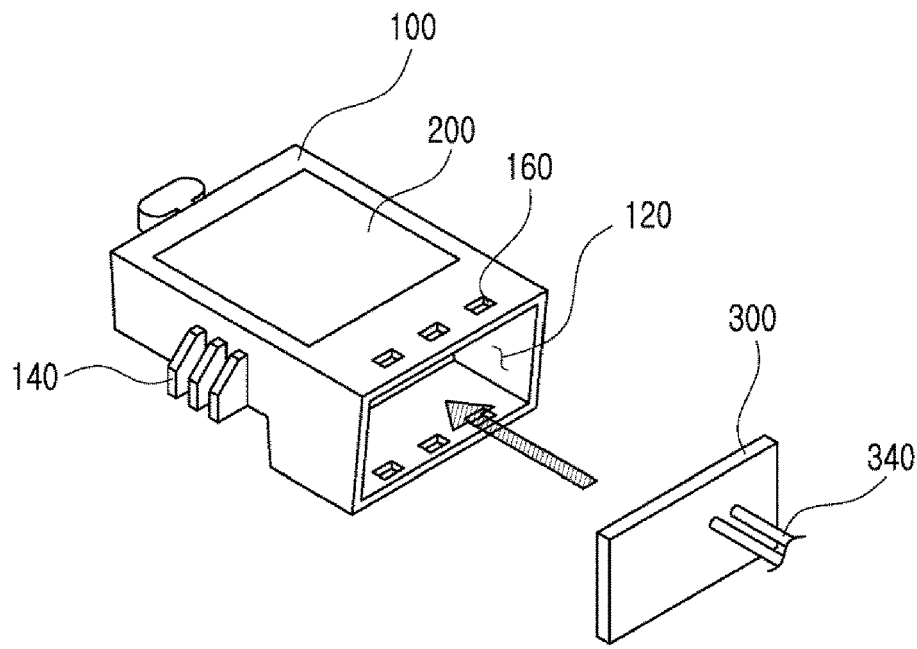

Next, as shown in FIG. 7, the circuit part 300, on which the light source 320 for emitting light is mounted, may be seated on the inner lower portion of the case 100. The light source 320 such as an LED light that is illuminable upon supply of an external power may be mounted on one side of the circuit part 300, and a cable 340 capable of receiving power from the outside may be provided on the other side of the circuit part 300. The cable 340 may receive power from the outside and provide the supplied power to the light source 320 such that the light source 320 emits light.

Then, as shown in FIG. 8, the sealing part 8 may seal the opening 120 with the circuit part 300 being seated therein.

More specifically, in a state that the backlight apparatus for vehicle 1 is mounted in the space between the upper mold 50 and the lower mold 70, the molding resin is supplied through the injection hole 55 passed through the upper mold 50 so that the opening 120 can be sealed. The upper mold 50 and the lower mold 70 may be configured to be vertically separable from each other, and a molding space may be formed between the upper mold 50 and the lower mold 70. The molded BSD, that is, the backlight apparatus for vehicle 1 may be seated in the molding space, and the upper mold 50 may be provided with the injection hole 55 that is passed through the upper mold 50 so that the molding resin can be supplied into the molding space. The molding resin supplied from a molding machine 90 flows into the opening 120 having the circuit part 300 seated therein, through the injection hole 55, to fill the opening 120 so that the opening 120 is hermetically sealed.

As described above, since the molding resin is supplied to the molding space between the upper mold 50 and the lower mold 70 through the injection hole 55 and flows towards the opening 120 where the circuit part 300 is seated, it is possible to completely waterproof and seal the opening 120 of the molded BSD with the lens 200 and the case 100 integrally formed therein. In addition, since the molding resin is also supplied into at least hole 160 formed in the case 100 to increase the adhesion to the case 100, the circuit part 300 can be made of a rigid structure that is not separable even when the cable 340 of the circuit part 300 is pulled out.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A backlight apparatus for a vehicle, comprising:
a case having an opening formed at a lower portion;
a lens provided on a front side of the case;
a circuit part seated on an inner lower portion of the case through the opening, and mounted with a light source for emitting light;
a light guide plate mounted on an inner upper portion of the case through the opening to diffuse the light emitted from the light source and deliver the light to the lens;
a reflective plate disposed behind the light guide plate through the opening to reflect light leaking to the back of the light guide plate; and
a sealing part for sealing the opening with the circuit part seated therein;
wherein the case is integrally formed with the lens; and
wherein the case is formed with at least one hole passed through the case in a downward direction from a position at which the circuit part is seated.

2. A backlight apparatus for a vehicle, comprising:
a case having an opening formed at a lower portion;
a lens provided on a front side of the case;
a circuit part seated on an inner lower portion of the case through the opening, and mounted with a light source for emitting light;
a light guide plate mounted on an inner upper portion of the case through the opening to diffuse the light emitted from the light source and deliver the light to the lens;
a reflective plate disposed behind the light guide plate through the opening to reflect light leaking to the back of the light guide plate, the reflective plate comprising a flat plate part and a bent part bent from both ends of the flat plate part to reflect light leaking to the back and sides of the light guide plate; and
a sealing part for sealing the opening with the circuit part seated therein.

3. The backlight apparatus for the vehicle of claim 2, wherein the flat plate part is integrally formed with the bent part.

4. The backlight apparatus for the vehicle of claim 1, wherein, in a state that the backlight apparatus for the vehicle is mounted in a space between an upper mold and a lower mold, the sealing part is formed by a molding resin supplied through an injection hole formed in the upper mold.

5. The backlight apparatus for the vehicle of claim 4, wherein the molding resin is formed of any of polyvinyl chloride (PVC), polypropylene (PP), Macromelt, and hot-melt.

6. A manufacturing method of a backlight apparatus for a vehicle, comprising:
placing, through an opening at a lower portion of a case, a reflective plate for reflecting light, wherein the case has a lens provided on a front side;

placing, through the opening, a light guide plate for diffusing the light and delivering the same to the lens, on the reflective plate inside the case;

seating a circuit part having a light source for emitting light mounted thereon, at an inner lower portion of the case; and sealing the opening with the circuit part seated therein;

wherein the case is integrally formed with the lens;

wherein the case is formed with at least one hole passed through the case in a downward direction from a position at which the circuit part is seated, and wherein the sealing the opening with the circuit part seated therein comprises supplying a molding resin to the opening with the circuit part seated therein, and to the at least one hole, to seal the opening and the at least one hole.

7. A manufacturing method of a backlight apparatus for a vehicle, comprising:

placing, through an opening at a lower portion of a case, a reflective plate for reflecting light, wherein the case has a lens provided on a front side;

placing, through the opening, a light guide plate for diffusing the light and delivering the same to the lens, on the reflective plate inside the case;

seating a circuit part having a light source for emitting light mounted thereon, at an inner lower portion of the case; and sealing the opening with the circuit part seated therein, wherein the reflective plate comprises a flat plate part and a bent part bent from both ends of the flat plate part to reflect light leaking to the back and sides of the light guide plate.

8. The manufacturing method of claim 7, wherein the flat plate part is integrally formed with the bent part.

9. A manufacturing method of a backlight apparatus for a vehicle, comprising:

placing, through an opening at a lower portion of a case, a reflective plate for reflecting light, wherein the case has a lens provided on a front side;

placing, through the opening, a light guide plate for diffusing the light and delivering the same to the lens, on the reflective plate inside the case;

seating a circuit part having a light source for emitting light mounted thereon, at an inner lower portion of the case; and sealing the opening with the circuit part seated therein by mounting the backlight apparatus for the vehicle in a space between an upper mold and a lower mold; and in a state that the vehicle backlight is mounted, supplying the molding resin through an injection hole formed in the upper mold to seal the opening.

10. The manufacturing method of claim 6, wherein the molding resin is formed of any of polyvinyl chloride (PVC), polypropylene (PP), Macromelt, and hotmelt.

* * * * *